US011244372B2

(12) United States Patent
Bhatt et al.

(10) Patent No.: US 11,244,372 B2
(45) Date of Patent: Feb. 8, 2022

(54) REMOTE DETERMINATION OF A SUITABLE ITEM

(71) Applicant: INTERNATIONAL BUSINESS MACHINES CORPORATION, Armonk, NY (US)

(72) Inventors: Sonal Bhatt, Chhindwara (IN); Sonia Lynette Sequeira, Pune (IN); Hemant Kumar Sivaswamy, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 101 days.

(21) Appl. No.: 16/286,907

(22) Filed: Feb. 27, 2019

(65) Prior Publication Data

US 2020/0273082 A1 Aug. 27, 2020

(51) Int. Cl.
*G06Q 30/00* (2012.01)
*G06Q 30/06* (2012.01)
*G06K 7/14* (2006.01)

(52) U.S. Cl.
CPC ....... *G06Q 30/0631* (2013.01); *G06K 7/1413* (2013.01); *G06K 7/1417* (2013.01); *G06Q 30/0627* (2013.01); *G06Q 30/0643* (2013.01)

(58) Field of Classification Search
CPC .............. G06Q 30/0269; G06Q 10/20; G06Q 30/0631; G06Q 30/0627; G06Q 30/0643; G06K 7/1413; G06K 7/1417

(Continued)

(56) References Cited

U.S. PATENT DOCUMENTS 9,129,404 B1 9/2015 Wagner et al.
10,185,934 B2 * 1/2019 Gupta ................ G06Q 30/0269
(Continued)

FOREIGN PATENT DOCUMENTS

CA 2878678 A1 * 1/2014 .......... G06F 16/954

OTHER PUBLICATIONS

Designing Sensing-augmented Wireless Systems for the Internet of ThingsWei, Teng. The University of Wisconsin—Madison. ProQuest Dissertations Publishing, 2018. Dialog #2115204490 212pgs. (Year: 2018).*

(Continued)

*Primary Examiner* — Robert M Pond
(74) *Attorney, Agent, or Firm* — Cantor Colburn LLP; Diana Roberts Gerhardt (57) ABSTRACT

Methods, systems and computer program products for remotely determining a suitable item are provided. Aspects include registering a plurality of Internet-of-Things (IoT) devices. Aspects also include receiving sensor data from the plurality of IoT devices. The sensor data is associated with a plurality of owned objects in a vicinity of the plurality of IoT devices. Aspects also include creating an owned object registry based on the sensor data. The owned object registry includes physical attributes of each of the plurality of owned objects. Aspects also include determining an object of interest based on monitoring of a user's interactions with a website. Aspects also include determining a degree of suitability between the object of interest and one or more of the plurality of owned objects based on the owned object registry. Aspects also include transmitting a notification of the degree of suitability to a user device for display.

16 Claims, 6 Drawing Sheets

(58) Field of Classification Search
USPC .................................................. 705/26, 27
See application file for complete search history.

(56) References Cited

U.S. PATENT DOCUMENTS

| | | | |
|---|---|---|---|
| 2011/0055054 A1 | 3/2011 | Glasson | |
| 2015/0019342 A1 | 1/2015 | Gupta et al. | |
| 2016/0239585 A1* | 8/2016 | Leppanen | G01S 5/0263 |
| 2017/0116660 A1* | 4/2017 | DeLuca | G06Q 30/0635 |
| 2017/0154356 A1* | 6/2017 | Trevisiol | G06Q 30/0272 |
| 2017/0345079 A1* | 11/2017 | Rangan | G06Q 30/0633 |
| 2018/0144292 A1* | 5/2018 | Mattingly | G06Q 10/087 |
| 2018/0247222 A1* | 8/2018 | Tolomei | H04L 67/22 |
| 2019/0208181 A1* | 7/2019 | Rowell | H04N 5/23267 |
| 2019/0361407 A1* | 11/2019 | Vogel | G06Q 10/063114 |
| 2020/0099544 A1* | 3/2020 | Dickens | H04L 12/2809 |
| 2021/0081343 A1* | 3/2021 | Suzuki | G06F 3/016 |

OTHER PUBLICATIONS

Guo et al, "From the Internet of Things to Embedded Intelligence," 29pgs. (Year: 2012).*

Anonymous, "Texture Analysis" Mathworks; URL: https://www.mathworks.com/help/images/texture-analysis-1.html. Retrieved Jan. 21, 2019. 2 pages.

Shapiro, Linda G. and George Stockman, "Computer Vision," Published Feb. 2001. Excerpt. 14 pages.

Strese et al., "Remote Texture Exploration," 2016 IEEE Haptics Symposium, Apr. 11-13, 2016. 1 page.

Wollaston, Victoria "The end of online returns? App lets you see how clothes will fit based on items you already own", URL: http://www.dailymail.co.uk/sciencetech/article-2582685/The-end-online-returns-Shopping-app-lets-clothes-fit-based-items-own.html; published Mar. 17, 2014; 38 pgs.

* cited by examiner

REMOTE DETERMINATION OF A SUITABLE ITEM

BACKGROUND

The present invention generally relates to online shopping, and more specifically, to remotely determining a suitable item.

Purchasers of goods from e-commerce websites often face difficulty when choosing the right size of a product. For example, if a user purchases a cabinet that is intended to be placed on the underside of a desk, it may not be entirely clear from viewing online photos and accompanying descriptions whether the cabinet will actually fit as intended under the desk. The selection and ordering of an unsuitable item generally result in the item being returned, which represents a large waste in time, money and effort on both the part of both the consumer and the merchant.

SUMMARY

Embodiments of the present invention are directed to a computer-implemented method for remotely determining a suitable item. A non-limiting example of the computer-implemented method includes registering a plurality of Internet-of-Things (IoT) devices. The method also includes receiving sensor data from the plurality of IoT devices. The sensor data is associated with a plurality of owned objects in a vicinity of the plurality of IoT devices. The method also includes creating an owned object registry based on the sensor data. The owned object registry includes physical attributes of each of the plurality of owned objects. The method also includes determining an object of interest based on monitoring of a user's interactions with a website. The method also includes determining a degree of suitability between the object of interest and one or more of the plurality of owned objects based on the owned object registry. The method also includes transmitting a notification of the degree of suitability to a user device for display.

Embodiments of the present invention are directed to a system for remotely determining a suitable item. The system includes a memory having computer readable computer instructions, and a processor for executing the computer readable instructions. The computer readable instructions include instructions for registering a plurality of Internet-of-Things (IoT) devices. The computer readable instructions also include instructions for receiving sensor data from the plurality of IoT devices. The sensor data is associated with a plurality of owned objects in a vicinity of the plurality of IoT devices. The computer readable instructions also include instructions for creating an owned object registry based on the sensor data. The owned object registry includes physical attributes of each of the plurality of owned objects. The computer readable instructions also include instructions for determining an object of interest based on monitoring of a user's interactions with a website. The computer readable instructions also include instructions for determining a degree of suitability between the object of interest and one or more of the plurality of owned objects based on the owned object registry.

Embodiments of the invention are directed to a computer program product for remotely determining a suitable item, the computer program product comprising a computer readable storage medium having program instructions embodied therewith. The computer readable storage medium is not a transitory signal per se. The program instructions are executable by a processor to cause the processor to perform a method. A non-limiting example of the method includes registering a plurality of Internet-of-Things (IoT) devices. The method also includes receiving sensor data from the plurality of IoT devices. The sensor data is associated with a plurality of owned objects in a vicinity of the plurality of IoT devices. The method also includes creating an owned object registry based on the sensor data. The owned object registry includes physical attributes of each of the plurality of owned objects. The method also includes determining an object of interest based on monitoring of a user's interactions with a website. The method also includes determining a degree of suitability between the object of interest and one or more of the plurality of owned objects based on the owned object registry. The method also includes transmitting a notification of the degree of suitability to a user device for display.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
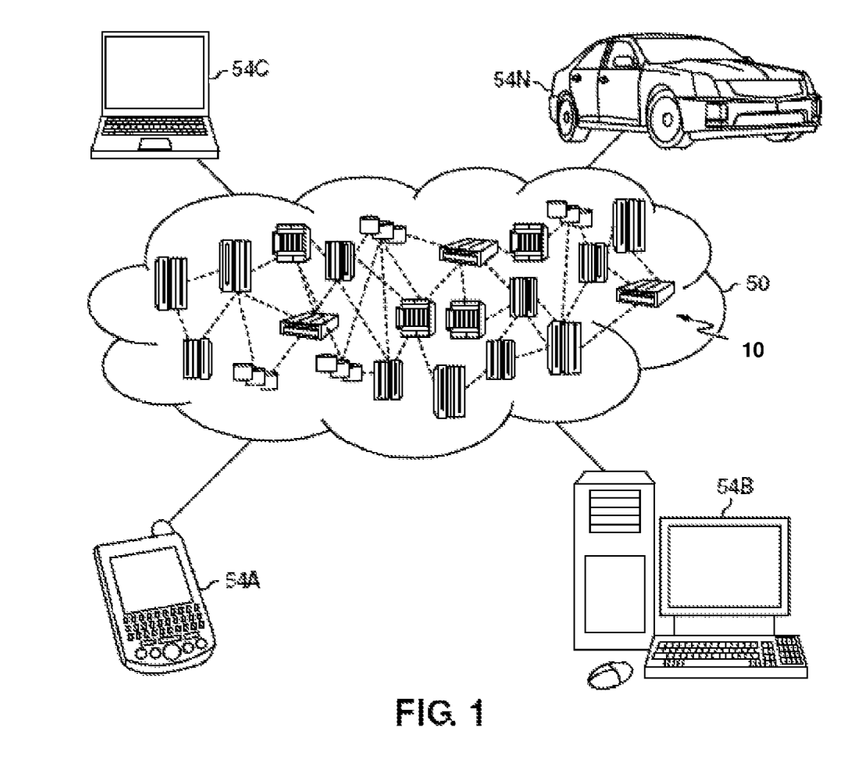
FIG. 1 depicts a cloud computing environment according to one or more embodiments of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
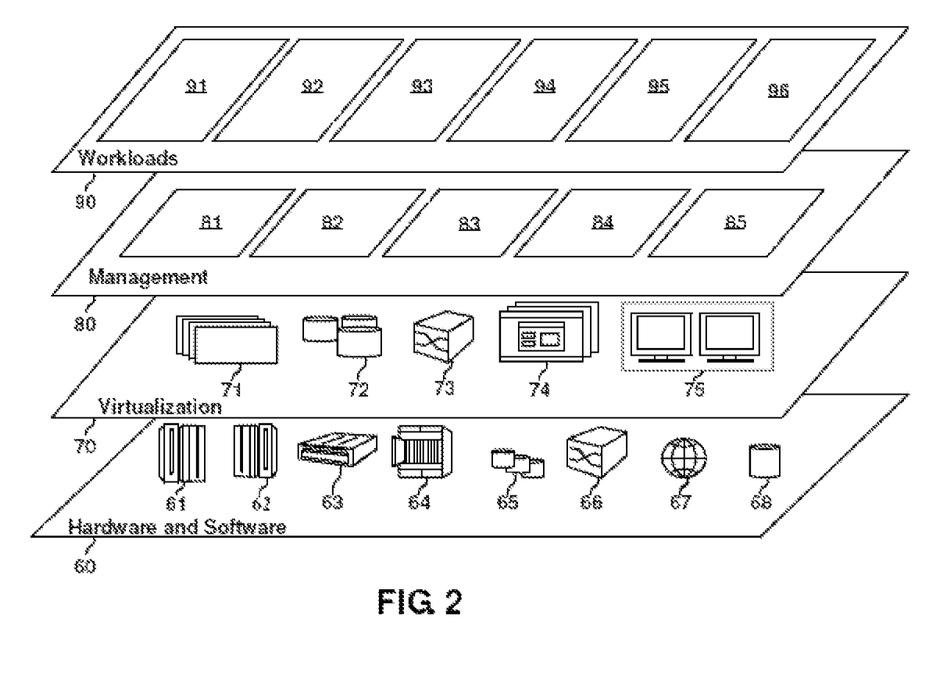
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and remotely determining a suitable item 96.

Figure 3:
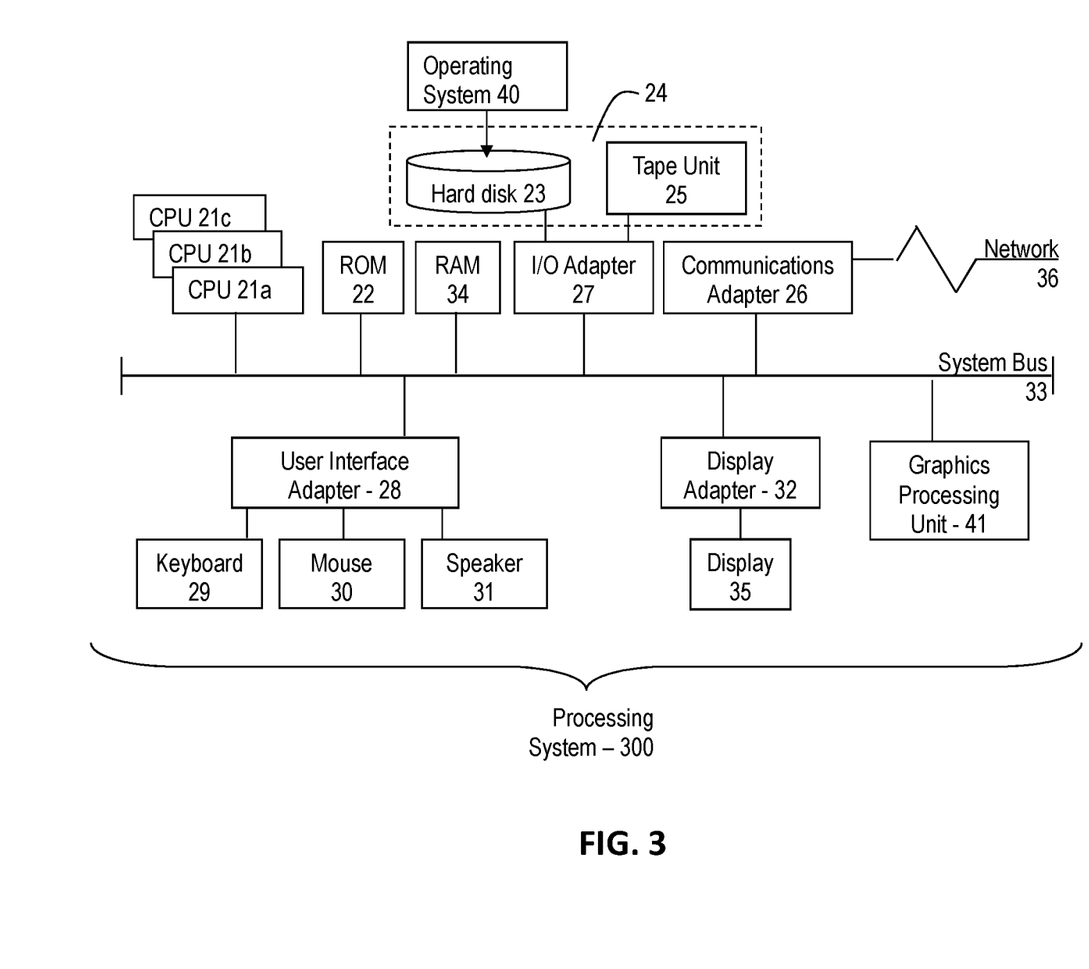
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

In exemplary embodiments, a system for remotely determining a suitable item is provided. In exemplary embodiments, the system may allow a user to register a plurality of Internet-of-Things (IoT) devices with the system. Each of the plurality of IoT devices can have one or more sensors that can collect data on the objects in a consumer's home. For example, various IoT devices may include cameras or laser measurement devices that can allow the IoT devices to collect information about the size, shape, length, width, depth, color, texture or other such aspects of an object. The system can use this information to create a registry of objects within the vicinity of the IoT devices. For example, a registry can provide a list of objects in one or more rooms of a user's home or office. In some embodiments, a layout of objects can also be determined by the system and stored by the system. The registry may include a profile of each object that contains all of the known and observed information about the object, such as size, shape, color, dimensions, brand, spacing with respect to other objects, and the like.

According to some embodiments, the system may utilize the information in the registry to aid the user in selecting a suitable item when, for example, shopping on an e-commerce website. A suitable item may be an item that is considered to fit in with, match, or complement the objects in the user's environment (e.g., in their home). For example, a suitable cabinet may be a cabinet that has dimensions that allow it to comfortably be positioned on the underside of a desk and that has a color that matches the desk. According to some embodiments, the system can determine an object of interest that a user is considering buying, by for example, observing the user's browsing behavior or determining that a user has selected an item to place in their online cart for purchase. Based on the determined object of interest, the system can then assist the user in ensuring that the object the user purchases will be suitable for their environment by, for example, providing a score or ranking of suitability based on a comparison of known features of the object to the profiles of one or more of the objects in the registry. In some embodiments, the system can identify similar alternative items to the object of interest and present a ranked list of possible choices of items in order of suitability. For example, if a user is viewing a cabinet on an e-commerce website, the system may provide a list of similar cabinets that may have different sizes, shapes, colors, and other such features, that are ranked by their suitability for the user's environment. In this way, the system can provide the user with an idea of how well the object of interest will fit in with the other objects in for example, their home, and automatically present alternative choices to provide alternative choices that may be more suitable. In some embodiments, the system may identify an object already owned by the user that has a similar aspect of the object of interest to allow comparisons. For example, if a user is considering buying a vase but it is difficult to tell exactly what the size of the vase is from the pictures or description, the system can for example, identify a milk jug in the user's refrigerator as having roughly the same height and circumference as the vase to allow the user to use the milk jug as a physical comparison. Thus, the disclosed system can help the user make better choices with regards to remote items and can save the user time, money and frustration by ensuring that the ordered item will fit in with the user's other belongings as expected, thereby avoiding the costly process of returning the item and seeking out a replacement.

Figure 4:
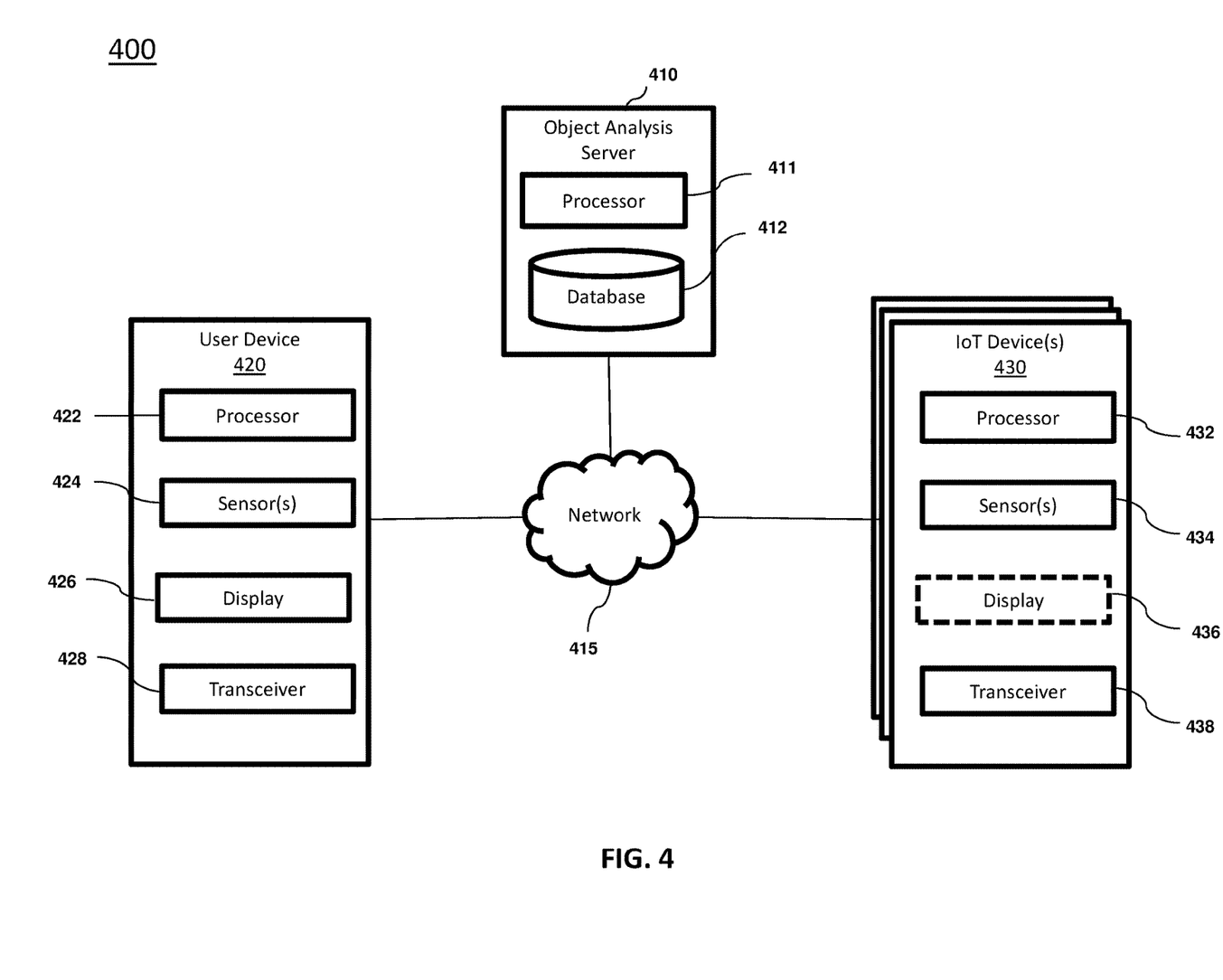
FIG. 4 depicts a system upon which remotely determining a suitable item may be implemented according to one or more embodiments of the present invention.

Turning now to FIG. 4, a system 400 for remotely determining a suitable item will now be described in accordance with an embodiment. The system 400 includes an object analysis server 410 in communication with a user device 420 and one or more IoT devices 430 via communications network 415. The communications network 415 may be one or more of, or a combination of, public (e.g., Internet), private (e.g., local area network, wide area network, virtual private network), and may include wireless and wireline transmission systems (e.g., satellite, cellular network, terrestrial networks, etc.).

In some embodiments, an object analysis server 410 can include a processor 411 and a storage device 412 for storing data and executing the functionality described herein. According to some embodiments, object analysis server 410 may communicate with user device 420 or IoT devices 430 to perform a registration of one or more of the IoT devices 430 with the object analysis server 410. Registering an IoT device 430 can mean that the object analysis server 410 associates the IoT device 430 with an account and/or environment associated with a user and can be configured to receive data from the registered IoT device(s) 430 to build a registry of objects owned by or otherwise in the vicinity and/or environment of the IoT device(s). For example, registering a smart refrigerator with the object analysis server 410 can mean that the smart refrigerator will sensor data regarding objects stored in the smart refrigerator as well as any other data detected by the smart refrigerator. Likewise, registering a home security camera with the object analysis server may mean that the home security camera may gather and provide visual data relating to objects within the home security camera's field of view, which can then be used to build object profiles for a registry of owned objects. As will be understood by those of skill in the art, there are many different types of IoT devices 430 with different sensing capabilities, and it is contemplated that any such IoT device 430 can be registered with the object analysis server 410 to provide sensor data on objects in the environment. Further, as will be understood by those of skill in the art, IoT device 430 registration can be achieved by for example, a software program stored and executed on user device 420 that allows a user to select one or more IoT devices 430 that are within a user's environment and cause sensor data obtained from those IoT devices 430 to be provided to object analysis server 410. In some embodiments, IoT device 430 registration may be performed by object analysis server 410 in response to inputs made to user device 420. For example, object analysis server 410 may host a website that can be accessed by user device 420, which allows a user of user device 420 to input identifications of IoT devices 430 to register with the object analysis server 410. A registry may include a list of objects and associated features (e.g, dimensions, height, length, size, brand, color, etc.). In some embodiments, object analysis server 410 can be configured to display the registry to a user via user device 420 and may allow a user to modify, add and/or delete objects from the registry. Thus, if a user opts to remove an object from the registry, this object will not be considered when determining a degree of suitability of an object of interest.

According to some embodiments, object analysis server 410 can include software that is configured to allow object analysis server 410 to determine an object of interest. An object of interest can be an object that a user of user device 420 may be interested in purchasing via an e-commerce website. For example, object analysis server 410 may be configured to monitor website browsing performed by user device 420 and determine or identify an object of interest based on the user's activity while browsing. As will be appreciated by those of skill in the art, internet browsing may be monitored based on a software application that has been downloaded by user device 420, through the use of cookies, or other such software that may be passively or actively subscribed to by a user of user device 420. According to some embodiments, object analysis server 410 can identify or determine an object of interest by, for example, determining that a user has viewed a particular object for more than a threshold period of time, determining that a user has searched for posted (e.g., on social media) about an object or determining that a user has added an object to a virtual shopping cart on an e-commerce website.

According to some embodiments, object analysis server 410 can be configured to determine a degree of suitability between an object of interest and one or more of a plurality of objects owned by the user of user device 420, based on the profiles of one or more objects in the object registry. For example, the object analysis server 410 can compare the various known attributes (e.g., as derived from information provided by the e-commerce site or from other Internet sources) of the object interest to the physical attributes of one or more objects in the registry stored by object analysis server 410 to determine how well the objects match or complement one other. The nature of each analysis, comparison, and scoring can depend on the nature of the object itself. For example, if the object of interest is a piece of furniture, such as a chair, the object analysis server 410 may determine how well the chair fits with a couch owned by the user by comparing the color and height of the chair to the couch, although the length may not be considered as it is not expected that the length of a chair will match the length of a couch. Those of skill in the art will recognize, that various different algorithms that provide different weights to different features may be used to determine a degree of suitability between items based on the nature of the items of at issue. According to some embodiments, in determining a degree of suitability, the object analysis server 410 may consider the layout of one or more objects within a room (as determined based on the IoT sensor data). According to some embodiments, object analysis server 410 may determine a list of alternatives to the object of interest, determine degrees of suitability of each, and present the user with a ranked list of alternatives. For example, if the object of interest is a chair, the object analysis server 410 may access a list of all chair offered by an e-commerce website and score and rank them for presentation to the user.

In some embodiments, the object analysis server 410 may provide a suggestion to a user of user device 420 to move one or more objects around in a room to determine if a given object of interest may be suitable. For example, in the case of a chair, the object analysis server 410 may determine that the chair is a good fit with a couch in terms of size and style, but due to limited space in the room it may not be a good fit with the room itself, so the object analysis server 410 may provide a suggestion to the user (e.g., via user device 420) to adjust the position of a coffee table to make room for the chair. In response to the user moving the coffee table, the object analysis server 410 may receive updated or real-time sensor data from IoT devices 430 to evaluate the new layout of the room and update the suitability score based on the new layout. In some embodiments, object analysis server 410 may ping one or more IoT devices 430 to cause them to obtain and provide updated sensor readings. In some embodiments, the object analysis server 410 may receive a user input indicating a degree of approval or disapproval of the new layout that may be factored into the updating of the degree of suitability of the object.

According to some embodiments, object analysis server 410 may be configured to compare an object of interest to one or more objects of the register to identify an object that is owned by the user that is similar to the object of interest across one or more aspects (e.g., size, height, length, width, color, texture, etc.) to use as a basis for comparison. For example, as previously described above the object analysis server 410 may notify the user that a jug of milk in their refrigerator is of a similar height and circumference as a vase that is an object of interest. The object analysis server may be configured to receive one or more user inputs (e.g., via user device 420) in response to providing such a notification that indicates a user's feedback on the comparison. For example, the user may place the milk jug on a shelf that is intended to house the vase and may determine that the milk jug is too big or too small for the shelf being used. Following receipt of this feedback from the user, the object analysis server may update a determined degree of suitability associated with the object of interest and may provide one or more alternatives that the object analysis server 410 deems to be more suitable. In this way, the system 400 can facilitate the evaluation of a suitability of an object of interest for the surrounding environment, despite the fact that the object of interest is not physically present in the environment.

User device 420 can be any device that is capable of performing surfing of the Internet or shopping on e-commerce websites. In some embodiments, the user device may also be configured to interact with IoT devices 430 and object analysis server 410 to facilitate the registration of one or more IoT devices 430 with the system to obtain and provide sensor data relating to objects within the environment of the user of user device 420. In exemplary embodiments, a user device 420 can be, but is not limited to, a smartphone, a wearable device such as a smartwatch, an augmented reality headset, a tablet, a computer system such as the one shown in FIG. 3, a smart speaker, a television, or any other suitable electronic device. The user device 420 includes a processor 422, one or more sensors 424, a display 426 and a transceiver 428. The sensors 424 can include one or more of an image capture device (e.g., digital camera) for obtaining images and/or videos, a microphone for obtaining audio recordings, and a location sensor for obtaining location data of the user device (e.g., GPS coordinates). User devices 420 can include an input device, such as a keyboard (either physical or digital) for receiving user input text. Text can also be input orally via a microphone using voice recognition. In some embodiments, display 426 is configured to display images and/or video. In some embodiments, display 426 can be a touchscreen that may be configured to detect tactile user inputs (e.g., typing, pressing, swiping, etc.). Transceiver 428 can be configured to allow a user device 420 to communicate with other devices via communications network 415 (e.g., via Wi-Fi, cellular communications, etc.).

In some embodiments, IoT devices 430 can include any type of device that has a processor 432, at least one sensor 434 and is configured to communicate with the user device 420 and/or object analysis server 410 (e.g., via a transceiver 438). One or more IoT devices 430 may include a camera for determining the shape, dimensions, layout, texture (e.g., utilizing texture segmentation to perform a visual texture analysis on an image) and/or color of an object, a laser for measuring distance, a weight sensor for determining weight, a microphone for obtaining sounds, or any other such suitable sensor that may determine a characteristic of an object. Some types of IoT devices 430, such as for example, a smart refrigerator, may optionally include a display 436 for displaying information. According to some embodiments, one or more IoT devices 430 may include a sensor that is capable of scanning or reading a smart tag associated with an object. A smart tag may be, for example, an RFID tag, a barcode, a QR code or any other similar type of tag or code, that may provide information about the object, such as its physical attributes, stock keeping unit number, and/or brand. For example, a smart refrigerator may be capable of reading a smart tag of every item placed within the refrigerator, allowing it to have detailed information about the contents of the refrigerator. According to some embodiments, IoT devices 430 may continuously obtain sensor data and transmit it to object analysis server 410. In some embodiments, IoT devices 430 may intermittently obtain and transmit sensor data, for example, every five minutes. In some embodiments, one or more IoT devices 430 can be configured to obtain updated sensor data in response to an instruction from user device 420 or object analysis server 410.

Figure 5:
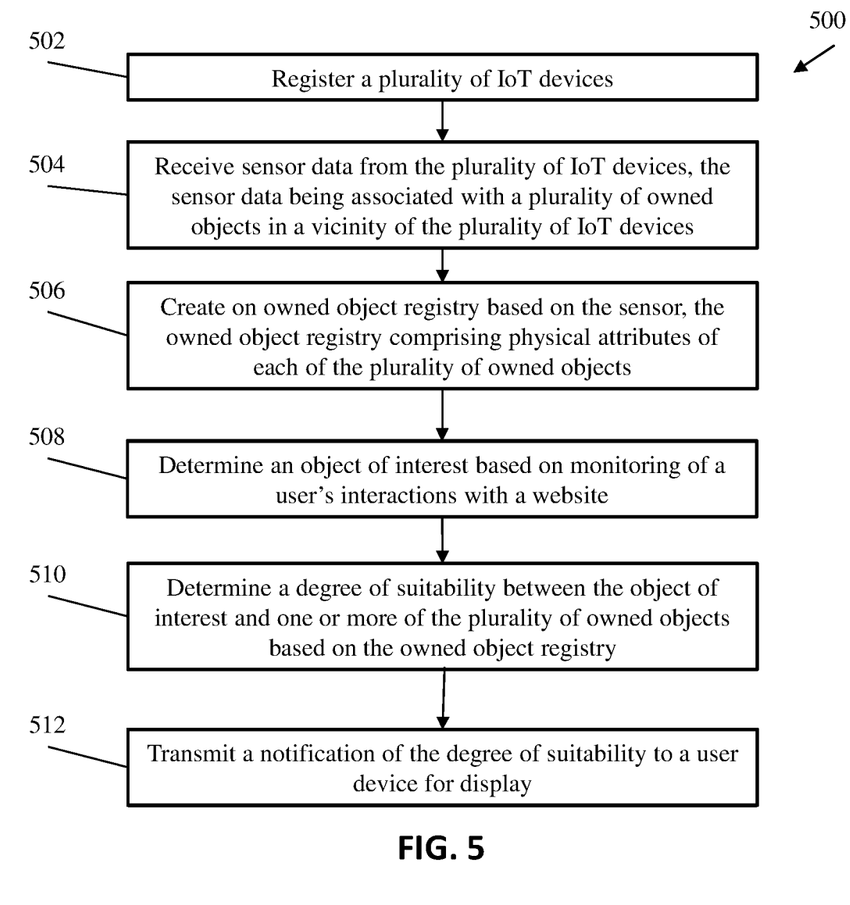
FIG. 5 depicts a flow diagram of a method for remotely determining a suitable item according to one or more embodiments of the invention.

Turning now to FIG. 5, a flow diagram of a method 500 for remotely determining a suitable item according to one or more embodiments of the invention is shown. In one or more embodiments of the present invention, the method 500 may be embodied in software that is executed by computer elements located within a network that may reside in the cloud, such as the cloud computing environment 50 described herein above and illustrated in FIGS. 1 and 2. In other embodiments, the computer elements may reside on a computer system or processing system, such as the processing system 300 described herein above and illustrated in FIG. 3, or in some other type of computing or processing environment.

The method 500 begins at block 502 and includes registering (e.g., via object analysis server 410) a plurality of Internet-of-Things (IoT) devices. For example, various IoT devices 430 may be selected for registration by a user and input into the system via user device 420. In some embodiments, the sensor data may be received continuously (e.g., in real-time or in near real-time). In some embodiments, the sensor data may be received intermittently (e.g., in regular intervals or in response to a sensor obtaining an updated reading).

As shown in block 504, the method 500 includes receiving (e.g., via object analysis server 410) sensor data from the plurality of IoT devices. The sensor data is associated with a plurality of owned objects in a vicinity of the plurality of IoT devices. In some embodiments, a user may initially register one or more objects with the system by for example, placing an object in front of one or more sensors/IoT devices to be measured. In some embodiments the system or sensor(s) may identify objects without user assistance. For example, according to some embodiments, object analysis server 410 can identify each object by for example, performing image recognition analysis on or more images provided by an IoT sensor 430. In some embodiments, object analysis server 410 may automatically identify an item and its listed attributes by, for example, receiving data from a tag associated with the object that was read or detected by a sensor/IoT device. According to some embodiments, one or more IoT devices can be a camera, a laser sensor, a microphone, a scanner or a sensor configured to read a smart tag associated with an owned object.

As shown in block 506, the method 500 includes creating (e.g., via object analysis server 410) an owned object registry based on the sensor data, the owned object registry comprising physical attributes of each of the plurality of owned objects. Physical attributes may include one or more of shape, size, dimensions, height, length, width, thickness, color(s), texture, style, weight, and brand of an object or item. In some embodiments, the owned object registry may also include information about the brand and/or style of an object (e.g., determined by reading a smart tag of the object or performing image recognition on the object).

As shown in block 508, the method 500 includes determining (e.g., via object analysis server 410) an object of interest based on monitoring of a user's interactions with a website. For example, according to some embodiments, determining an object of interest may include one or more of determining that a user has performed a search for the object of interest (e.g., via user device 420), determining the user device has displayed the object of interest for more than a threshold period of time, determining a user has performed a search for a type of object associated with the object of interest, and determining the user device has displayed the type of object associated with the object of interest for more than the threshold period of time.

As shown in block 510, the method 500 includes determining (e.g., via object analysis server 410) a degree of suitability between the object of interest and one or more of the plurality of owned objects based on the owned object registry. According to some embodiments, determining the degree of suitability between the object of interest and one or more of the plurality of owned objects may include comparing known physical attributes of the object of interest to the physical attributes of one or more of the plurality of owned objects. In some embodiments, the degree of suitability may be a representation of how well the object of interest fits with one or more owned objects of the plurality of owned objects in terms of one or more of: size, color, texture, style and brand. According to some embodiments, determining whether an object "fits with" one or more owned objects may refer to whether objects are suitable for one another in terms of size, color, texture, brand, style or other such metrics. Although it should be understood that determining an item "fit" does not necessarily mean that the object of interest and an owned object match each other, as in some contexts it may be desirable for objects to have complementary aspects (e.g., a throw pillow has a color that complements a couch instead of matches the couch). As described previously above, determining fit or suitability can be performed by executing various algorithms that may differ greatly based on the nature of the objects at issue.

As shown in block 512, the method 500 includes transmitting (e.g., via object analysis server 410) a notification of the degree of suitability to a user device for display. For example, if a user is surfing an e-commerce website for a chair and places a chair in their online shopping cart, object analysis server 410 may cause the e-commerce website to display a notification that provides a representation of the degree of suitability of the chair with the other furniture or objects owned by the user or positioned in the room that the user intends to place the chair (e.g., as may be specified by the user to the system 400). This may allow the user to access how well the chair will fit, which can allow them to make a purchasing decision or decide to seek alternatives.

According to some embodiments, the method 500 may further include determining (e.g., via object analysis server 410), based on the object of interest, a plurality of alternative objects, determining, for each of the plurality of alternative objects, a degree of suitability between the alternative object and one or more of the plurality of owned objects based on the owned object registry, ranking the object of interest and the plurality of alternative objects by their respective degree of suitability, and transmitting a recommendation to the user device, the recommendation comprising an identification of the object of interest or one of the plurality of alternative objects that is associated with the highest degree of suitability. Thus, for example, if looking for a chair, an e-commerce website may display a list of chairs that are ordered by their degree of suitability so that the user can select a chair from the list to purchase.

According to some embodiments, the method may further include removing data associated with one of the plurality of owned objects from the owned object registry based on a user input received from the user device. In some embodiments, the method may include modifying data associated with one of the plurality of owned objects from the owned object registry based on a user input received from the user device.

Figure 6:
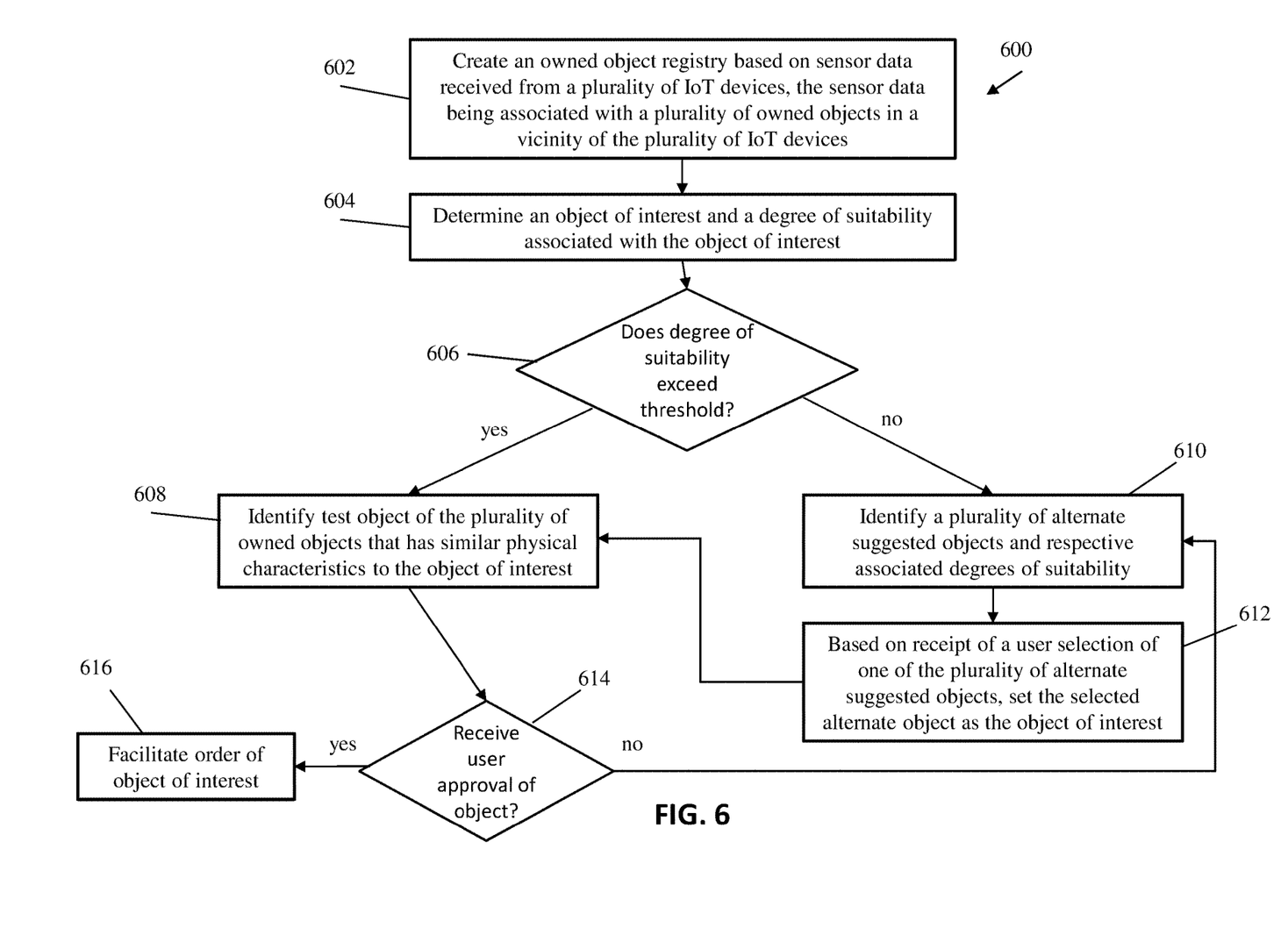
FIG. 6 depicts a flow diagram of a method for facilitating the ordering of a suitable item according to one or more embodiments of the invention.

FIG. 6 shows a flow diagram of a method 600 for remotely facilitating the ordering of a suitable item in accordance with an embodiment. In one or more embodiments of the present invention, the method 600 may be embodied in software that is executed by computer elements located within a network that may reside in the cloud, such as the cloud computing environment 50 described herein above and illustrated in FIGS. 1 and 2. In other embodiments, the computer elements may reside on a computer system or processing system, such as the processing system 300 described herein above and illustrated in FIG. 3, or in some other type of computing or processing environment.

The method 600 begins at block 602 and includes creating (e.g., via object analysis server 410) an owned object registry based on sensor data received from a plurality of IoT devices in a manner similar to that described above with respect to blocks 502, 504 and 506.

As shown at block 604, the method includes determining (e.g., via object analysis server 410) an object of interest and a degree of suitability associated with the object of interest, for example, in a manner similar to that described above with respect to blocks 508 and 510.

As shown at block 606, the method includes determining (e.g., via object analysis server 410) whether the degree of suitability exceeds a predetermined threshold. For example, if the degree of suitability is represented as a percentage, a user may specify a threshold of 90% suitability. If the system determines that the degree of suitability does exceed the predetermined threshold, the method proceeds to block 608 at which point the method includes identifying a test object of the plurality of owned objects that has similar physical characteristics to the object of interest. For example, as described previously above, if the user is shopping for a vase but is unsure of the size of a vase they are viewing online, the object analysis server 410 may identify a test object (e.g., a milk jug) owned by the user that the user can physically access and use to assess the suitability of the object of interest.

If the system determines that the degree of suitability does not exceed the predetermined threshold, the method proceeds to block 610 at which point the method includes identifying a plurality of alternate suggested objects and respective associated degrees of suitability, for example in a manner similar to that previously described above. As shown at block 612, the method includes receiving (e.g., via user device 420) a user selection of one of the plurality of alternate suggested objects and based on the selection, setting the selected alternate object as the object of interest. In other words, the "object of interest" referred to in block 608 will be supplanted by the alternate suggested object selected by a user at block 612.

As shown at block 614, the method includes determining (e.g., via object analysis server 410) whether the system has received a user approval of the object of interest. If the system determines that the user has rejected the object of interest, the method proceeds back to block 610 where the plurality of alternate suggested objects and/or respective associated degrees of suitability may be adjusted to for example, remove the rejected object of interest or add new alternate suggested objects of interest. For example, the user may place the test object in the location intended to house the object of interest and may determine that based on the fit of the test object in the space, the object of interest will be too large or too small, and therefore may strike the object of interest from consideration and opt to view alternative objects. If the system determines that the user has accepted the object of interest, the method proceeds to block 616 where the method includes facilitating an order of the object of interest. For example, an e-commerce website may proceed to check out to allow the user to purchase the object.

Additional processes may also be included. It should be understood that the processes depicted in FIGS. 5 and 6 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   registering a plurality of Internet-of-Things (IoT) devices;
   measuring, by a laser sensor of at least one of the plurality of IoT devices, one or more of a size and spacing of a plurality of owned objects in a vicinity of the plurality of IoT devices;
   receiving sensor data from the plurality of IoT devices, the sensor data being associated with the plurality of owned objects in the vicinity of the plurality of IoT devices;
   creating an owned object registry based on the sensor data, the owned object registry comprising physical attributes of each of the plurality of owned objects and spacing data for each of the plurality of owned objects with respect to the plurality of owned objects;
   determining, based on monitoring of a user's interactions with a website, an object of interest, wherein determining the object of interest includes determining that a user device has displayed the object of interest on the website for more than a threshold period of time;
   determining a degree of suitability between the object of interest and one or more of the plurality of owned objects based on the owned object registry;
   transmitting a notification of the degree of suitability to a user device for display; and
   removing data associated with one of the plurality of owned objects from the owned object registry based on a user input received from an input device of the user device.

2. The computer-implemented method of claim 1, wherein the physical attributes comprise one or more of: shape, size, dimensions, height, length, width, thickness, color(s), texture, style, weight and brand.

3. The computer-implemented method of claim 1, wherein determining the degree of suitability between the object of interest and one or more of the plurality of owned objects comprises comparing known physical attributes of the object of interest to the physical attributes of one or more of the plurality of owned objects.

4. The computer-implemented method of claim 3, wherein the degree of suitability comprises a representation of how the object of interest fits with one or more owned objects of the plurality of owned objects in terms of one or more of: size, color, texture, style and brand.

5. The computer-implemented method of claim 1, further comprising:

determining, based on the object of interest, a plurality of alternative objects;

determining, for each of the plurality of alternative objects, a degree of suitability between the alternative object and one or more of the plurality of owned objects based on the owned object registry;

ranking the object of interest and the plurality of alternative objects by their respective degree of suitability; and transmitting a recommendation to the user device, the recommendation comprising an identification of the object of interest or one of the plurality of alternative objects that is associated with the highest degree of suitability.

6. The computer-implemented method of claim 1, further comprising modifying data associated with one of the plurality of owned objects from the owned object registry based on a user input received from the user device.

7. The computer-implemented method of claim 1, wherein the sensor data is received intermittently or continuously.

8. The computer-implemented method of claim 1, wherein determining an object of interest comprises one or more of:

determining a user has performed a search for the object of interest;

determining a user has performed a search for a type of object associated with the object of interest; and determining the user device has displayed the type of object associated with the object of interest for more than the threshold period of time.

9. A system comprising:

a processor communicatively coupled to a memory, the processor configured to:

register a plurality of Internet-of-Things (IoT) devices;

measure, by a laser sensor of at least one of the plurality of IoT devices, one or more of a size and spacing of a plurality of owned objects in a vicinity of the plurality of IoT devices;

receive sensor data from the plurality of IoT devices, the sensor data being associated with the plurality of owned objects in the vicinity of the plurality of IoT devices;

create an owned object registry based on the sensor data, the owned object registry comprising physical attributes of each of the plurality of owned objects and spacing data for each of the plurality of owned objects with respect to the plurality of owned objects;

determine, based on monitoring of a user's interactions with a website, an object of interest, wherein determining the object of interest includes determining that a user device has displayed the object of interest on the website for more than a threshold period of time;

determining a degree of suitability between the object of interest and one or more of the plurality of owned objects based on the owned object registry;

transmitting a notification of the degree of suitability to a user device for display; and removing data associated with one of the plurality of owned objects from the owned object registry based on a user input received from an input device of the user device, wherein at least one of the plurality of IoT devices comprises a laser sensor configured to measure one or more of a size and spacing of the plurality of owned objects.

10. The system of claim 9, wherein the physical attributes comprise one or more of: shape, size, dimensions, height, length, width, thickness, color(s), texture, style, weight and brand.

11. The system of claim 9, wherein determining the degree of suitability between the object of interest and one or more of the plurality of owned objects comprises comparing known physical attributes of the object of interest to the physical attributes of one or more of the plurality of owned objects.

12. The system of claim 9, the processor further configured to:

determine, based on the object of interest, a plurality of alternative objects;

determine, for each of the plurality of alternative objects, a degree of suitability between the alternative object and one or more of the plurality of owned objects based on the owned object registry;

rank the object of interest and the plurality of alternative objects by their respective degree of suitability; and transmit a recommendation to the user device, the recommendation comprising an identification of the object of interest or one of the plurality of alternative objects that is associated with the highest degree of suitability.

13. The system of claim 9, wherein determining an object of interest comprises one or more of:

determining a user has performed a search for the object of interest;

determining a user has performed a search for a type of object associated with the object of interest; and determining the user device has displayed the type of object associated with the object of interest for more than the threshold period of time.

14. A computer program product comprising a computer readable storage medium having program instructions embodied therewith the program instructions executable by a computer processor to cause the computer processor to perform a method comprising:

registering a plurality of Internet-of-Things (IoT) devices;

measuring, by a laser sensor of at least one of the plurality of IoT devices, one or more of a size and spacing of a plurality of owned objects in a vicinity of the plurality of IoT devices;

receiving sensor data from the plurality of IoT devices, the sensor data being associated with the plurality of owned objects in the vicinity of the plurality of IoT devices;

creating an owned object registry based on the sensor data, the owned object registry comprising physical attributes of each of the plurality of owned objects and spacing data for each of the plurality of owned objects with respect to the plurality of owned objects;

determining, based on monitoring of a user's interactions with a website, an object of interest, wherein determining the object of interest includes determining that a user device has displayed the object of interest on the website for more than a threshold period of time;

determining a degree of suitability between the object of interest and one or more of the plurality of owned objects based on the owned object registry;

transmitting a notification of the degree of suitability to a user device for display; and removing data associated with one of the plurality of owned objects from the owned object registry based on a user input received from an input device of the user device, wherein at least one of the plurality of IoT devices comprises a laser sensor configured to measure one or more of a size and spacing of the plurality of owned objects.

15. The computer program product of claim 14, wherein determining the degree of suitability between the object of interest and one or more of the plurality of owned objects comprises comparing known physical attributes of the object of interest to the physical attributes of one or more of the plurality of owned objects.

16. The computer program product of claim 14, wherein determining an object of interest comprises one or more of:
   determining a user has performed a search for the object of interest;
   determining a user has performed a search for a type of object associated with the object of interest; and
   determining the user device has displayed the type of object associated with the object of interest for more than the threshold period of time.

* * * * *